United States Patent [19]

Petrucco et al.

[11] B 3,985,694

[45] Oct. 12, 1976

[54] ASPHALTIC COMPOSITIONS CONTAINING SYNTHETIC TERPENIC RESIN AND AN INTERPOLYMER OF ETHYLENE, VINYL ACETATE AND AN ORGANIC ACID

[75] Inventors: Richard J. Petrucco, Laurel Springs; Charles A. Pagen, Woodbury, both of N.J.

[73] Assignee: Mobil Oil Corporation, New York, N.Y.

[22] Filed: Aug. 29, 1974

[21] Appl. No.: 501,540

[44] Published under the second Trial Voluntary Protest Program on January 13, 1976 as document No. B 501,540.

[52] U.S. Cl. .................. 260/28.5 AS; 260/28.5 AV
[51] Int. Cl.² ........................................ C08L 91/00
[58] Field of Search .............. 260/28.5 AS, 28.5 AV

[56] References Cited
UNITED STATES PATENTS

| | | |
|---|---|---|
| 3,215,657 | 11/1965 | Beresniewicz et al. ....... 260/78.5 HC |
| 3,414,533 | 12/1968 | Trieschmann et al. ....... 260/28.5 AS |
| 3,442,841 | 5/1969 | Adelman ...................... 260/28.5 AS |
| 3,629,164 | 12/1971 | Smith et al. .................. 260/28.5 AS |
| 3,645,947 | 2/1972 | Quigg et al. .................. 260/28.5 AS |
| 3,821,144 | 6/1974 | Goyer et al. .................. 260/28.5 AS |

*Primary Examiner*—M. J. Welsh
*Attorney, Agent, or Firm*—Charles A. Huggett; Raymond W. Barclay

[57] ABSTRACT

Asphaltic compositions, having improved elastic properties, durability and resistance to deterioration by oil and grease and improved adhesion to aggregate particles, are provided comprising a major amount of asphalt, a minor amount of a synthetic terpenic resin and an interpolymer of ethylene, vinyl acetate and an organic acid.

8 Claims, No Drawings

ASPHALTIC COMPOSITIONS CONTAINING SYNTHETIC TERPENIC RESIN AND AN INTERPOLYMER OF ETHYLENE, VINYL ACETATE AND AN ORGANIC ACID

BACKGROUND OF THE INVENTION

1. Field of the Invention

This invention relates to asphaltic compositions and, in one of its aspects, relates more particularly to asphaltic compositions which exhibit improved elastic properties. Still more particularly, in this aspect, the invention relates to asphaltic compositions exhibiting improved elastic properties, durability and resistance to deterioration by oil and grease and improved adhesion to aggregate particles, and suitable for use in such applications where criteria of suppleness and high mechanical resistance must be satisfactorily met.

2. Description of the Prior Art

The use of asphalt binders for road-building and other various industrial applications, is known. These products have, however, heretofore exhibited weak elastic properties, thus limiting their use in fields where the aforementioned criteria of suppleness and high mechanical resistance are a necessary requirement. In this regard, it has, heretofore, been proposed to incorporate various additives in the asphaltic composition for increasing the desired elasticity. For such purposes, copolymers of ethylene and vinyl acetate have been proposed, for example, as disclosed in U.S. Pat. No. 3,442,841. It is found, however, that although the incorporation of copolymers of ethylene and vinyl acetate enables the elasticity of the asphalt to be increased, it also produces asphaltic compositions which present insufficient cohesion (i.e., stress necessary for a given deformation) and also weak adhesiveness. In commonly assigned U.S. Pat. No. 3,821,144 asphaltic compositions having improved cohesive properties are disclosed, comprising a major amount of asphalt, a minor amount of a synthetic terpenic resin and a copolymer of ethylene and vinyl acetate. In this respect, however, it is found that although such asphaltic compositions exhibit good elastic and cohesive properties, improved durability and resistance to deterioration by oil and grease and improved adhesion to aggregate particles are still to be desired.

SUMMARY OF THE INVENTION

In accordance with the present invention, there are provided new and improved asphaltic compositions, possessing improved elasticity, good cohesive properties, durability, improved resistance to deterioration by oil and grease, and improved adhesiveness, rendering these materials useful in numerous fields of application, including coatings for various surfaces, metal-work and particularly on orthotropic steel and concrete bridge deck surfaces and various types of aggregates.

In general, the improved asphaltic compositions of the present invention comprise a major amount of asphalt, a minor amount of a synthetic terpenic resin and a minor amount of an interpolymer of ethylene, vinyl acetate and an organic acid. In its more specific applications, the improved asphaltic compositions, in general, comprise, by weight, from about 50 to about 94% asphalt, from about 1 to about 30% of a synthetic terpenic resin and from about 5 to about 40% of an interpolymer of ethylene, vinyl acetate and an organic acid.

The synthetic terpenic resins employed in the novel asphaltic compositions of the present invention, are resins derived from terpenic raw materials such as turpentine, pine oil, and related materials. The principal constituent of turpentine is a terpene or pinene. The principal constituent of pine oil is a mixture of terpene alcohols (largely alphaterpineol) with small amounts of terpene hydrocarbons and ethers. The pine oil, for this purpose, is obtained by steamed-distillation of pine wood. In addition to the recovery of pine oil and turpentine as employed in the aforementioned process, other terpene hydrocarbons such as limonene, dipentene, terpinene and terpinolene are also obtained as intermediate fractions.

The principal methods for producing resinous materials from the aforementioned substances are by oxidation or by polymerization. In this respect, it is found that turpentine tends to resinify during storage, probably because of oxidation. The evaporation of turpentine and pine oils in open vessels yields resinous materials as a result of oxidation and polymerization. A more complete description of the aforementioned synthetic terpenic resins, as employed in the novel asphaltic compositions of the present invention can be found in "The Chemistry of Synthetic Resins," by Carleton Ellis, Vol. I, Rheinhold Publishing Corporation, New York, N.Y., 1935.

The synthetic terpenic resin, employed in the novel asphaltic compositions of the present invention, preferably has a softening point (Ring and Ball) from about 50° to about 200°C. Still more particularly preferred are synthetic resins having a softening point (Ring and Ball) from about 95° to about 105°C. and a density at 25°C. of about 0.93.

The asphalt employed in the novel composition preferably has a softening point (Ring and Ball) from about 50° to about 200°C. Still more particularly preferred, are asphalts whose softening point is between about 43° and 60°C. and whose ASTM penetration index as 25°C. is from about 40 to about 70.

The interpolymers of the asphaltic compositions of the present invention have a melt index of 0.5 to 500 and contain at least 65%, by weight, of ethylene, at least 5%, by weight, vinyl acetate and from about 0.01 to about 3%, by weight, of an organic acid. Any organic acid may be employed. Preferably, the organic acid is selected from the group consisting of acrylic, methacrylic, itaconic, maleic and fumaric acids; the alkyl hydrogen maleates and the alkyl hydrogen fumarates; the monoacrylates and monomethacrylates of glycols; 2-hydroxy-3-amino-propyl allyl ether, allyl glycerol ether, divinyl glycol, 2-dimethylaminoethyl acrylate, 2-dimethylaminoethyl methacrylate and N-vinyl pyrrolidone. The preparation of these interpolymers is more fully disclosed in U.S. Pat. No. 3,215,657.

If so desired, the novel asphaltic compositions of the present invention may be employed, individually as hereinbefore described, or may include various filler materials and inert aggregates, for imparting additionally desired properties to the composition. These fillers or aggregates, in combination with the aforementioned binder (of asphalt, interpolymer and resin) may comprise from about 85 to about 95%, by weight, of the total binder-aggregate mixture.

DESCRIPTION OF SPECIFIC EMBODIMENTS

In order to provide a better understanding of the improved properties realized in the use of the novel asphaltic compositions of the present invention, a comparison was made between the asphalt binder blends comprising an asphalt, a synthetic terpenic resin and a copolymer of ethylene and vinyl acetate, as disclosed in the aforementioned U.S. Pat. No. 3,821,144, and an asphalt binder blend comprising an asphalt, a synthetic terpenic resin and an interpolymer of ethylene, vinyl acetate and an organic acid.

The asphalt employed in each of the aforementioned comparative tests comprised a pure asphalt having a 120/150 penetration. The copolymer of ethylene and vinyl acetate comprised approximately 28%, by weight, of units derived from the vinyl acetate. The interpolymer comprised an ethylene-vinyl acetatemethacrylic acid interpolymer having a melt index of 6 and containing 27.5%, by weight, vinyl acetate, 0.7%, by weight, methacrylic acid and 71.8%, by weight, ethylene. The synthetic terpenic resin had a softening point of 95°C. to 105°C. and a density at 25°C. of about 0.93, and was obtained by the catalytic polymerization of alpha and beta pinenes occurring in turpentine. The respective paving blends are illustrated below in percent by weight:

|  | Blend A | Blend B |
|---|---|---|
| Asphalt | 75 | 75 |
| Ethylene-vinyl acetate copolymer | 20 | — |
| Ethylene-vinyl acetate-methacrylic acid interpolymer | — | 20 |
| Terpenic resin | 5 | 5 |

The individual blends A and B were prepared in the conventional manner, by first melting the asphalt, blending in the polymer or interpolymer, and, finally, adding the synthetic terpenic resin.

In order to evaluate the adhesion properties of the binder blends, each blend was heated to 400°F. and then used to coat aggregate particles, previously heated to 275°F. These aggregates comprise typical asphalt hot-mix crushed river paving aggregate gravel. The aggregate and binders were quickly and thoroughly mixed to yield a mixture having a uniform distribution of asphalt binder throughout. All aggregate particles were effectively coated with the binder employing this procedure. All aggregate particles, previously washed with water and dried at 275°F., were graded so that they passed through a ⅜ inch sieve and were retained on a No. 4 sieve. Each paving mixture sample was prepared employing 94%, by weight, of hot (275°F.) aggregate and 6%, by weight, of individual hot asphalt binder blend. The coated aggregate was mixed thoroughly to insure complete coverage by the asphalt binder.

The coated aggregate asphalt paving mixture binder blends were next subjected to a severe test to develop comparative results of the two binders relative to adhesion characteristics. The test simply consisted of subjecting the coated aggregates to six freeze-thaw cycles in 100 cc. distilled water containing 2 grams NaCl followed by boiling the respective paving mixes in distilled water for a period of 45 minutes after which the coated aggregate mixtures were then visually inspected for degree of coverage. Due to the complex nature of adhesion, the performance of asphalt-aggregate-water systems, for evaluation of adhesive properties, is carried out in laboratory tests, employing visual examination of the aggregate to evaluate binder quality. A substantial difference in adhesive properties, by such visual evaluation, was noted between the aforementioned blends A and B. Aggregate particles coated with the copolymer-containing blend A, showed about 10% of the stripped stone area, while particles coated with the interpolymer-containing blend B, showed less than 1% of the stripped stone area visible.

While preferred embodiments of the novel asphaltic compositions of the present invention have been described for purposes of illustration, it will be understood that various modifications and adaptations thereof, which will be obvious to those skilled in the art, may be made without departing from the spirit of the invention.

I claim:

1. An asphaltic composition comprising a major amount of asphalt, a minor amount of a synthetic terpenic resin, and a minor amount of an interpolymer of ethylene, vinyl acetate, and an organic acid selected from the group consisting of acrylic, methacrylic, itaconic, maleic and fumaric acids; the alkyl hydrogen maleates and the alkyl hydrogen fumarates.

2. The asphaltic composition of claim 1 comprising, by weight, from about 50 to about 94% asphalt, from about 5 to about 40% of an interpolymer of ethylene, vinyl acetate and an organic acid, and from about 1 to about 30% of a synthetic terpenic resin.

3. The asphaltic composition of claim 1 characterized in that said asphalt has a softening point (Ring and Ball) from about 50° to about 200°C.

4. The asphaltic composition of claim 1 characterized in that said asphalt has a softening point (Ring and Ball) from about 43° to about 60°C. and an ASTM penetration index at 25°C. from about 40 to about 70.

5. The asphaltic composition of claim 1 characterized in that said interpolymer has a melt index of 0.5 to 500 and contains at least 65%, by weight, ethylene, and at least 5%, by weight, vinyl acetate, and from about 0.01 to about 3%, by weight, of said organic acid.

6. The asphalt composition of claim 1 characterized in that the organic acid of said interpolymer is methacrylic acid.

7. The asphaltic composition of claim 1 characterized in that the synthetic terpenic resin has a softening point (Ring and Ball) from about 50° to about 200°C.

8. The asphaltic composition of claim 1 characterized in that the synthetic terpenic resin has a softening point (Ring and Ball) from about 95° to about 105°C.

* * * * *